US008910200B2

(12) United States Patent
Jin

(10) Patent No.: US 8,910,200 B2
(45) Date of Patent: Dec. 9, 2014

(54) DEVICE, METHOD AND SYSTEM FOR SERVICE INSERTION DURING CONTENT DISPLAY

(75) Inventor: Luojun Jin, Waterloo (CA)

(73) Assignee: Rogers Communications Inc., Toronto (CA)

( * ) Notice: Subject to any disclaimer, the term of this patent is extended or adjusted under 35 U.S.C. 154(b) by 224 days.

(21) Appl. No.: 12/791,074

(22) Filed: Jun. 1, 2010

(65) Prior Publication Data

US 2011/0296478 A1    Dec. 1, 2011

(51) Int. Cl.
| | |
|---|---|
| H04N 7/10 | (2006.01) |
| H04N 7/025 | (2006.01) |
| G06F 13/00 | (2006.01) |
| H04N 7/173 | (2011.01) |
| H04N 21/431 | (2011.01) |
| H04N 21/438 | (2011.01) |
| H04N 21/462 | (2011.01) |
| H04N 21/6377 | (2011.01) |

(52) U.S. Cl.
CPC ....... *H04N 21/4316* (2013.01); *H04N 21/4383* (2013.01); *H04N 21/4622* (2013.01); *H04N 21/6377* (2013.01)
USPC .............................. 725/34; 725/100; 725/131

(58) Field of Classification Search
USPC ............. 725/32, 34, 36, 86, 91, 93, 100, 105, 725/114, 115, 116, 120, 131, 134
See application file for complete search history.

(56) References Cited

U.S. PATENT DOCUMENTS

| | | | |
|---|---|---|---|
| 7,580,080 B2 * | 8/2009 | Anderson | 348/565 |
| 2002/0087973 A1 * | 7/2002 | Hamilton et al. | 725/32 |
| 2003/0051249 A1 * | 3/2003 | Hoang | 725/95 |
| 2006/0123443 A1 * | 6/2006 | Hamilton et al. | 725/32 |
| 2009/0094639 A1 | 4/2009 | Haberman et al. | |
| 2009/0106792 A1 | 4/2009 | Kan et al. | |
| 2009/0158369 A1 * | 6/2009 | Van Vleck et al. | 725/110 |
| 2010/0023960 A1 * | 1/2010 | Hasson | 725/14 |
| 2010/0138868 A1 * | 6/2010 | Sie et al. | 725/46 |
| 2010/0153990 A1 * | 6/2010 | Ress et al. | 725/34 |
| 2011/0023065 A1 * | 1/2011 | Edlund et al. | 725/51 |

OTHER PUBLICATIONS

"SeaChange", http:www:schange.com/Products/Advertising/AdPulse.aspx.

* cited by examiner

*Primary Examiner* — John Schnurr
(74) *Attorney, Agent, or Firm* — Ridout & Maybee LLP

(57) ABSTRACT

A system, device and method for service insertion during a video display. A client device detects a video request input, and in response, selects and initiates an advanced service asset while the player buffers the requested video data. The output of the player is displayed in a background field while the media display data of the advanced service asset is displayed in a foreground field. The player display data may be brought to the foreground after a preset time or when the player is ready to display the requested video.

33 Claims, 6 Drawing Sheets

DEVICE, METHOD AND SYSTEM FOR SERVICE INSERTION DURING CONTENT DISPLAY

TECHNICAL FIELD

The present disclosure relates to video display and, more particularly, to methods and systems for providing services during the delay experienced when content is being delivered or buffering after being initiated.

BACKGROUND

Digital video transmission has become a regular service offering from many service providers, whether over conventional cable television networks, wireless networks, or packet-switched IP-based networks, such as the Internet. Consumers that view video streamed over a packet-switched IP-based network are somewhat used to the delay associated with the digital video buffering, particular when first initiated. Consumers of conventional television are less used to this delay, since analog television had little or no delay associated with a channel change event. Digital television, on the other hand, can produce delays during a channel change while the set-top box waits receive an I-frame in the broadcast stream and then buffers a suitable number of frames before beginning to play the video on a display screen. The delay can be greater when dealing with non-broadcast services, such as video-on-demand, etc.

Other non-video content can results in the same buffering or delivery delay associated with video. This situation will continue to exist as the growth of network bandwidth fails to keep up with the growth in the size and complexity of content, particular in the case of wireless transmission. Even without buffering issues, delay in content delivery can be a major cause of long channel change time.

Channel switch time is the delay that is measured from when the end user presses a button to change the channel, i.e. when a content request is input, until the new channel is displayed in full screen. The typical delay is 2 or more seconds for linear broadcast programs; for Video on Demand (VoD) or Pay Per View (PPV) the delay varies from a couple of seconds up to 1 minute depending on the system. As more and more high definition (HD) or 3D programs are demanded by consumers, there are greater demands for an effective fast channel change (FCC) solution.

Currently there are some solutions that attempt to reduce the delay that occurs during a channel change event in a video broadcast environment. One solution called instant channel change (ICC) involves placing servers within the broadcast network that maintain a continuously updated circular buffer of the entire recent content stream on all channels. When the switching channel event occurs, the server unicasts a cached stream of content from the requested channel starting with an I-frame to the client device at an accelerated rate. After the system sends enough cache content to 'catch up' to live TV, it begins to send new video content at the nominal bit rate of the stream.

The ICC solution is costly due to the need for fast high-capacity servers in the network continuously buffering all content, and it does not scale well.

It would be advantageous to provide for a method and system that, in part, improves the user experience in viewing digital content transmissions.

BRIEF DESCRIPTION OF THE DRAWINGS

Reference will now be made, by way of example, to the accompanying drawings which show example embodiments of the present application, in which.

DETAILED DESCRIPTION OF EXAMPLE EMBODIMENTS

Figure 1:
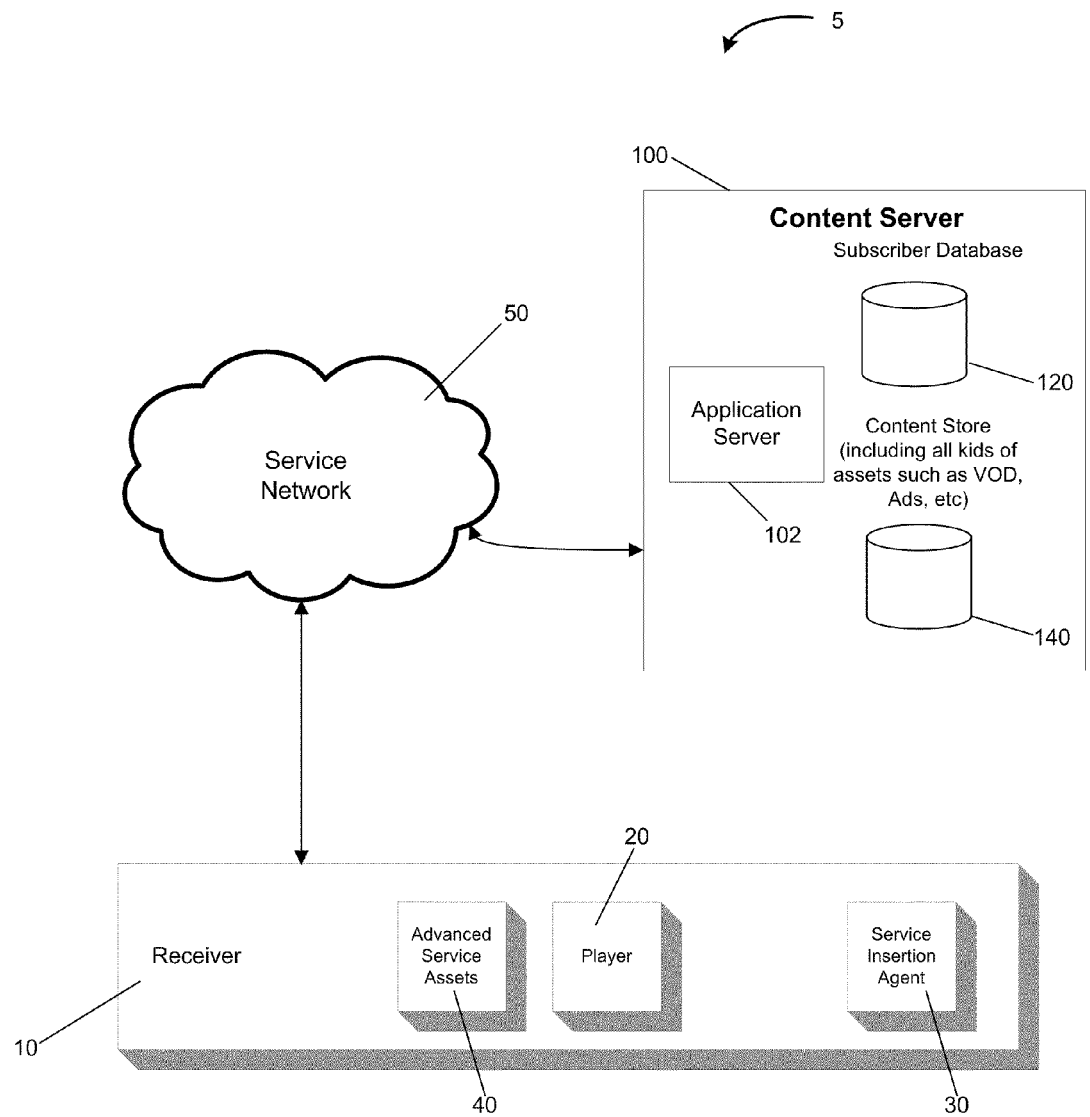
FIG. 1 diagrammatically shows a system for service insertion during video display in accordance to one example embodiment of the present disclosure.

The present disclosure provides a system, device and method for service insertion. In one embodiment, the service insertion method improves the user experience by exploiting the delays inherent in buffering video, such as during a channel switching event. During a channel switching event, instead of performing a conventional fast channel change solutions, the system will make full use of the delay as an opportunity to provide advanced services. More broadly, the present invention provides for a device and method of service insertion during initiation of a video display that relies upon video content transmitted to a client device over a network.

In one aspect, the present application describes a client device. The device includes an input port for receiving a video request; a network interface for receiving a transmitted video over a network in response to the video request; a player configured to play the transmitted video, including a buffer for storing frames of the transmitted video prior to outputting video for display, wherein the player is configured to output player display data; a memory storing an advanced service asset, wherein the advance service asset is configured to output media display data; a display driver for controlling output to a display device; and a service insertion agent configured to detect the video request and, in response, initiate the advanced service asset and instruct the display driver to put the player display data in a background field of display and put the media display data in a foreground field of display.

In another aspect, the present application describes a method of operating a client device for displaying video, the client device having a network interface for receiving video transmissions, a player for buffering and outputting video frames for display, and a memory storing an advanced service asset. The method includes detecting a video request input to the client device; the player receiving and buffering video data based on the video request, wherein the player is configured to output player video data; and in response to detecting the video request, initiating the advanced service asset, wherein the advanced service asset is configured to output media display data, placing the player video data from the player to a background field of display, and placing the media display data from the advance service asset to a foreground field of display.

In yet a further aspect, the present application describes a client device. The client device includes a network interface for receiving transmitted media content over a network in response to a content request input to the client device; a player configured to play the media content, wherein the player is configured to output requested content display data once available; a memory storing an advanced service asset, wherein the advance service asset is configured to output media display data; a display driver for controlling output to a display device; and a service insertion agent configured to detect the content request and, in response, initiate the advanced service asset and instruct the display driver to put the requested content display data in a background field of display and put the media display data in a foreground field of display.

In the following description, reference is made to channel change requests and requests for a video. The present application is not limited to video, and may be applicable to other media content that may be viewed or consumed by an end user, and that may be subject to delay in being presented due to transmission delay or buffering.

The present application also refers to a foreground field of display and a background field of display. The term "field" in this context is intended to refer to a display plane, in that the foreground field is "in front" of the background field from the point of view of a viewer of the display. In other words, the foreground field is the "active" or "viewable" field or plane, whilst the background field is the "hidden" or "inactive" field or plane. The term "field" in this context is not intended to refer to odd and even TV fields.

Figure 6:
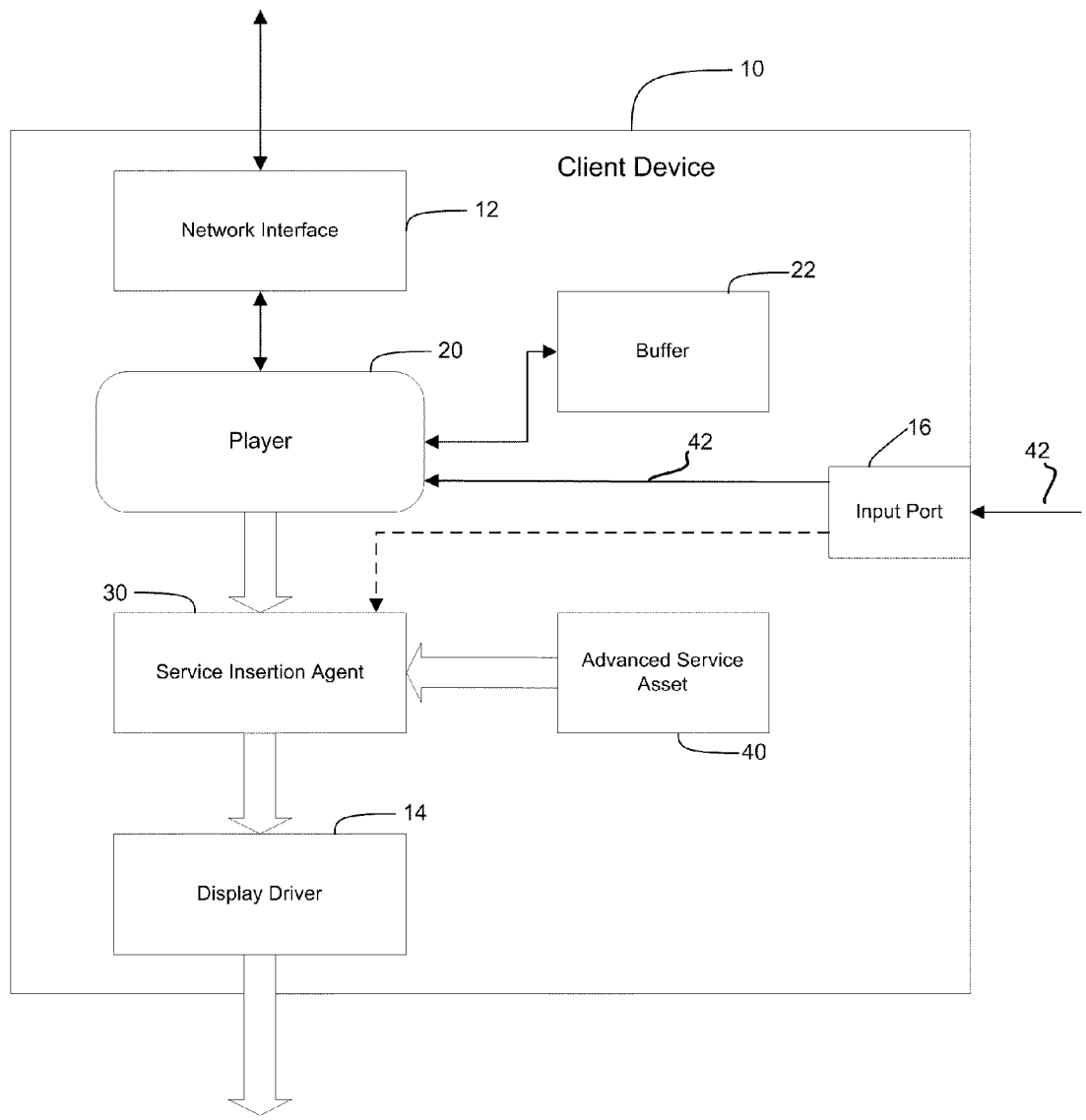
FIG. 6 shows, in block diagram form, an example client device in accordance with the present description.

Reference is first made to FIG. 6, which shows, in block diagram form, a client device 10. The client device 10 includes a network interface 12 and a player 20. The network interface 12 is configured to receive digital video transmissions from a remote source over a network. The digital video may be packetized and transmitted to the device over an IP-based network in some embodiments.

The player 20 is configured to receive the digital video transmission from the network interface 12 and output player video data. The client device 10 further includes a buffer 22 in which the player 20 stores reconstructed video frames until they are ready for output as player video data. The digital video transmissions received by the player 20 are compressed, for example in accordance with MPEG-2 or H.264/MPEG-4 standards or other video compression standards. The player 20 is configured to decode the compressed video data and output the player video data as frames of video data. Many such compression schemes rely upon temporal prediction. For example, some implementations conforming to the H.264 standard employ forward or bi-directional prediction in which frames previous to or after the present frame are used to supply data defining the pixel values of the present frame. Frames that are not based upon other frames are termed "I-frames", in which only inter-frame (spatial) prediction is used. To start output of a video, one or more I-frames may be necessary to reconstruct nearby frames. Accordingly, the player 20 may need to reconstruct and buffer a number of frames before it is ready to output frames of video data in as player video data for display on a display device. In some instances the player 20 may be configured to output default player video data whilst the desired video transmission is being buffered and reconstructed. For example, in some instances the player 20 may output a default screen or a buffering message as the player video data during this delay.

In some instances, the client device 10 is an integrated or set-top television receiver and the network is a broadcast network, such as a conventional wired cable television network or a satellite network. In some instances, the client device 10 is a computer, set-top receiver, or other computing device, and the network is an IP-based computer network, such as the internet. In yet other instances, the client device 10 may be a mobile device, laptop computer, or other computing device equipped with a wireless modem, and the network is a wireless network, such as a cellular network or wide area network (WAN), wireless local area network (WLAN), metropolitan area network (MAN), or other such wireless networks. In general, the client device 10 is any computing device configured to receive a compressed video transmission, decode the compressed video, and output player video data. In some instances, the client device 10 may include an integrated display device, such as in a mobile device, laptop, etc., but in other instances, the client device 10 outputs the player video data to an external display device, such as a computer monitor or television set, through a display driver 14.

In accordance with one aspect of the present application, the client device 10 includes a service insertion agent 30 and at least one advanced service asset 40. The advanced service asset 40 is stored in memory, such as RAM, ROM, flash memory, or harddisk etc. The advanced service asset 40 is configured to provide media display data. In one embodiment, the advanced service asset 40 includes an application program or "widget", containing computer-executable instructions configured to be executed by a processor and to output media display data relating to the application program. For example, the application program may relate to a game, quiz, information service, or other interactive service. In some instances, the application program may provide for user interaction, such as selection of options, preferences, or further information or services. In another embodiment, the advanced service asset 40 may include media content, such as a slideshow, a video, or image, with or without associated sound. In one instance, the advanced service asset 40 may include an advertisement. In another instance, the advanced service asset 40 may include a short entertainment feature, such as a video or audio clip.

The client device 10 includes an input port 16 for receiving an input selection via an input device. The input port 16 and associated input device may include a touchscreen, infrared remote control device, keyboard, keypad, trackball, mouse, or any other mechanism or device for receiving input from an external source, such as a user. In particular, the input port 16 is configured to receive a video request input 42. In the embodiment shown in FIG. 6, the video request input 42 is relayed to the player 20 so that the player 20 may select and/or request the desired video. In a broadcast environment, the client device 10 may receive multiple streaming videos simultaneously, and the player 20 and/or network interface 12 may be configured to tune to the desired stream. It will be understood that the term "tune" does not necessarily means that the streams are frequency multiplexed, but that the network interface 12 and/or player 20 select data from the network relating to the desired stream. In this context, the player 20 and/or network interface 12 do not necessarily transmit a request for the desired video into the network. However, in other embodiments, such as in a video-on-demand or server-based environment, the client device 10 may be configured to transmit a request for the desired video to a server within the network in response to the video request input 42.

In some instances, the video request input 42 may include selection of a video-on-demand title, request of a video from an online video source or service, or a channel selection request. In any of these instances, the video request input 42 is a request to start display of a video that will be transmitted to the client device 10.

In response to the video request input 42 the player 20 is configured to begin receiving, buffering, and eventually, outputting player display data relating to the requested video. While the video is buffering and before it is ready for display, the player 20 may be configured to output default player display data, as indicated above. The default player display data may include a blank screen, a "waiting" or "buffering" screen, or other such video data.

The service insertion agent 30 is configured to detect the video request input 42. In response, the service insertion agent 30 selects and initiates the advanced service asset 40. If more than one advanced service asset 40 is stored on the client device 10, the service insertion agent 30 is configured to select one of them such a predefined set of criteria or rules. As noted above, the advanced service asset 40 may, in one embodiment, include an executable application which, when executed by a processor, outputs media display data. In this context, "initiating" the advanced service asset 40 includes causing the advanced service asset 40 to be launched and executed on a processor in the client device 10. In another embodiment, the advanced service asset 40 may include stored media content, such as a video, in which case the media display data is the video. In this context, "initiating" the advanced service asset 40 includes causing the media content to be played by a media engine or player so as to generate the media display data.

The service insertion agent 30, having initiated the advanced service asset 40, causes the media display data to be placed in a foreground field of display and causes the player display data to be placed in a background field of display. It may do so by instructing the display driver 14 to generate a foreground field and a background field and to assign the media display data to the foreground field and assign the player display data to the background field. It may receive both the player display data and media display data and generate the output video having these fields for supply to the video display driver. The client device may include a graphics engine (not illustrated) to which the display data is fed and to which the service insertion agent 30 sends instructions regarding the fields and placement of the display data. In any of these embodiments, the service insertion agent 30 is configured to cause the player display data to be output in a background field of display while the media display data is output in a foreground field of display.

The service insertion agent 30 is configured to later cause the player display data to be brought to the foreground field of display. The service insertion agent 30 may be configured to make this change automatically or in response to an input through the input port 16. For example, the service insertion agent 30 may be configured to maintain the media display data in the foreground until the media display data (such as a short video or advertisement) is finished playing. It may then switch the display data so that the player display data is brought to the foreground. In another embodiment, it may maintain the media display data in the foreground until the player 20 is ready to output the requested video as player display data instead of the default player display data. At this point, the service insertion agent 30 may be configured to cause the player display data to the foreground so that the user does not miss any of the requested video. In yet another embodiment, the service insertion agent 30 may be configured to maintain the media display data in the foreground until a user request is received to switch to the player display data. In yet a further embodiment, the service insertion agent 30 may prompt the user for such an input when the requested video is ready for display. Other variations will be appreciated by those ordinarily skilled in the art having regard to the description herein.

In some instances, the foreground field may be framed smaller than the background field, so that the user can see some of the background field around the edges of the foreground field whilst the media display data is in the foreground. This allows the user to determine whether the requested video has started in the background and therefore whether to initiate a switch to the player display data. The switch to placing the player display data in the foreground may result in enlarging the foreground field to full screen for proper viewing of the player display data. In another embodiment, the foreground field may be partially transparent to enable partial viewing of the background field. Other embodiments will be appreciated by those ordinarily skilled in the art.

Figure 5:
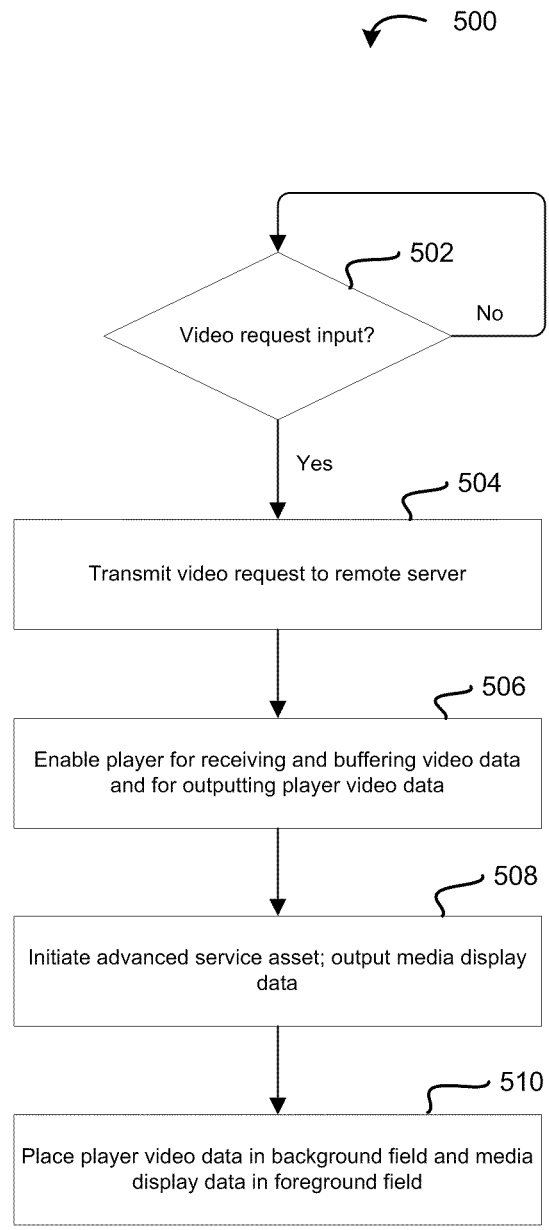
FIG. 5 is a flowchart showing an example method for displaying video content on a client device.

Reference is now made to FIG. 5, which shows, in flowchart form a method 500 of operating a client device for displaying video. The method 500 may be implemented on a client device, such as the client device 10 discussed above in connection with FIG. 6.

The method 500 includes monitoring for a video request input in step 502. As discussed above, the video request input may be a request for channel switch, a request for a remotely stored on-demand video, a request for access to a streamed video, or any other such request to initiated a video display relying upon a video transmission to the client device, as opposed to a locally-stored video. Once a video request input is detected in step 502, the method 500 may move to optional step 504, in which the video request results in transmission of a request for the desired video to a remote server. It will be appreciated that in a broadcast environment, the client device 10 does not necessarily need to send a request for the desired video to a remote server if the video is being streamed in a broadcast.

In step 506, in response to the video request input detected in step 502, the client device 10 enables a player to receive the desired video transmission. The player is configured to decode, buffer, and when ready, output frames of the desired video as player display data. As discussed above, while the video is being buffered and before it is ready for display, the player may be configured to output default player display data.

In step 508, also in response to detection of the video request input in step 502, the service insertion agent 30 initiates an advanced service asset 40. This may, in some embodiments, includes selecting the advanced service asset 40 from a collection or database of such assets stored in memory on the client device 10. The advanced service asset 40, when being executed or played, generates media display data.

In step 510, the service insertion agent 30 causes the media display data to be output for display in a foreground field, and causes the player display data to be output for display in a background field.

It will be appreciated that the method 500 may include further steps for triggering a switch to cause the player display data to be brought to the foreground field. Those ordinarily skilled in the art will recognize that various of the steps described herein may be performed simultaneously or in a different order, without materially impacting operation of the method.

Reference is now made to FIG. 1, which diagrammatically illustrates a system 5 according to one embodiment of the present application. The system 5 includes client device 10. The client device 10 receives video content through a service network 50. In this embodiment, the service network 50 may be any type of service network or platform for video transmission, such as cable TV (ETV/Tru2way/GEM), IPTV, Mobile TV, etc. The configuration of the service networks, such as cable television, IPTV, Mobile TV, etc., are well known to those skilled in the art. The client device 10 includes the player 20, the service insertion agent 30, and a local asset database or memory structure storing one or more advanced service assets 40.

The player 20 plays video content received through the service network 50. The video content played on the player 20 is displayed on a display device (not shown). In some instances, the display device may be integral to the client device 10. In other instances, the display device may be external and the client device 10 is configured to output display data to drive the display device.

The service insertion agent 30 on the client device 10 functions to monitor for and to detect a video request input, such as a channel switching event. A switching channel event is where an input is received from the user indicating the user wants to change the channel showing the current video content to another channel showing other video content. Another video request input may include selection of an on-demand video from a display menu or website.

Advanced service assets 40 are used to leverage the delay inherent in video buffering during a video initiation to supply advanced services. The advanced service assets 40 may be in the form of any or all of video, audio, internet webpages, interactive games, advertising, program recommendations, programming guide, "widget-based" services etc. The advance service asset 40 generates media display data.

The service insertion agent 30, upon detecting a video request input, sets the player 20 in a background mode and starts an advanced service asset 40 in a foreground mode, i.e. places the media display data in a foreground field. Background mode and foreground mode are references to how the player display data and the media display data are presented to the display integral with or connected to the client device 10. In background mode, the display data is displayed behind the display data that is set in the foreground mode. The background display data may be partially viewable to the user so that the user knows what content is running in the background mode. In other embodiments, the background mode may have the content fully hidden from view, where only the content set in foreground mode is viewable. Various display implementation designs of the foreground mode and background mode are contemplated by the present disclosure. Despite the player 20 being set in a background mode, the player 20 is still functioning as a normal receiver; that is the player 20 on the client device 10 is still receiving and playing the programming content from the service network 50. In the present embodiment, there is no interruption of the video transmission being received or played by the player 20 on the client device 10. The present system 5 does not "splice" the media display data into the player display data. Instead, the client device 10 continues to play the video received and outputs the resulting player display data but displays it in a background field so that advanced service may be initiated whilst the requested video is buffering and, in some instances, while it begins playing. The present system 5 supports the insertion of application-based advanced service assets 40, such as program recommendations, program guides, games, "widget"-type services, etc.

In one embodiment, the system 5 of the present disclosure is implemented within a cable television network. In this embodiment, the client device 10 may be a set-top box or receiver using a television or monitor as an external display device. In this context, the video request input may be a channel switch request received, for example, by way of an infrared remote control signal. In this context, the set-top box is configured to switch the player to the requested channel and initiate display of the new channel in the background on the television, and an advanced service will be displayed on the television in the foreground. The background and foreground modes may be achieved similarly to the display features picture-in-picture and/or picture-and-picture. Picture-in-picture is where one program is displayed on the full television screen at the same time as another program is displayed in inset windows. The picture-and-picture feature is where the television screen is divided into two parts, one program plays in one half of the screen, and the other program plays in the other half of the screen. In this sense, the terms "foreground" and "background" do not necessarily indicate that one field overlays the other field. In some cases, foreground and background fields are adjacent to one. Other respective arrangements of the fields are contemplated and intended to be included within the scope of the present application.

The system 5 may further comprise a content server 100. The server 100 may include an application server 102, such as a gaming server, an electronic program guide (EPG) server, a web server, etc. The server 100 communicates with the client device 10 through the service network 50. The server 100 includes a content store 140 that contains advanced service assets like the advanced service assets 40 stored locally on the client device 10. The content store 140 is updated regularly to provide new and different advanced service assets. The advanced service assets in the content store 140 may be in the form of any or all of video, audio, internet webpages, interactive games, video-on-demand, advertising, programming recommendations, programming guides, widget-based services, etc. The server 100 may provide one or more of the updated advanced service assets to the client device 10 via the service network 50. The client device 10 stores the updated advanced service assets in local storage.

In some embodiments, the system 5 selects and provides advanced service assets to the client device 10 based on reported customer profile and/or user behaviour information. In some further embodiments, the application server 102 may customize or modify an advanced service asset based on customer profile and/or user behaviour information before transmitting the customized advanced service asset to the client device 10.

To facilitate this feature, in some embodiments the service insertion agent 30 may also function to collect user behaviour information based upon one or more inputs received through the input port. For example, the user behaviour information may include selection history, viewing history etc. The service insertion agent 30 then provides this information to the server 100 via the service network 50. The server 100 stores this user behaviour information in a subscriber database 120. The subscriber database 120 may also include customer profile information. Customer profile information may be general information associated with the client device 10, such as an associated customer's age, gender, genre preferences, income bracket, geographic location, family characteristics or size, etc. The customer profile information may be initially established when the client device 10 is provisioned or sold to a particular customer in connection with registration for a broadcast service, for example. The customer profile information may also or alternatively be input through an application program or module on the client device 10, for example through a user-interactive selection menu. The advanced service assets selected by the server 100 and downloaded to the client device 10 may be based on the customer profile and/or user behaviour information. As a result, the advanced service assets 40 stored on the client device 10 and available for initiation in response to detecting a video request input, are tailored to specific client device 10 based on the information stored in the subscriber database 120.

Figure 2:
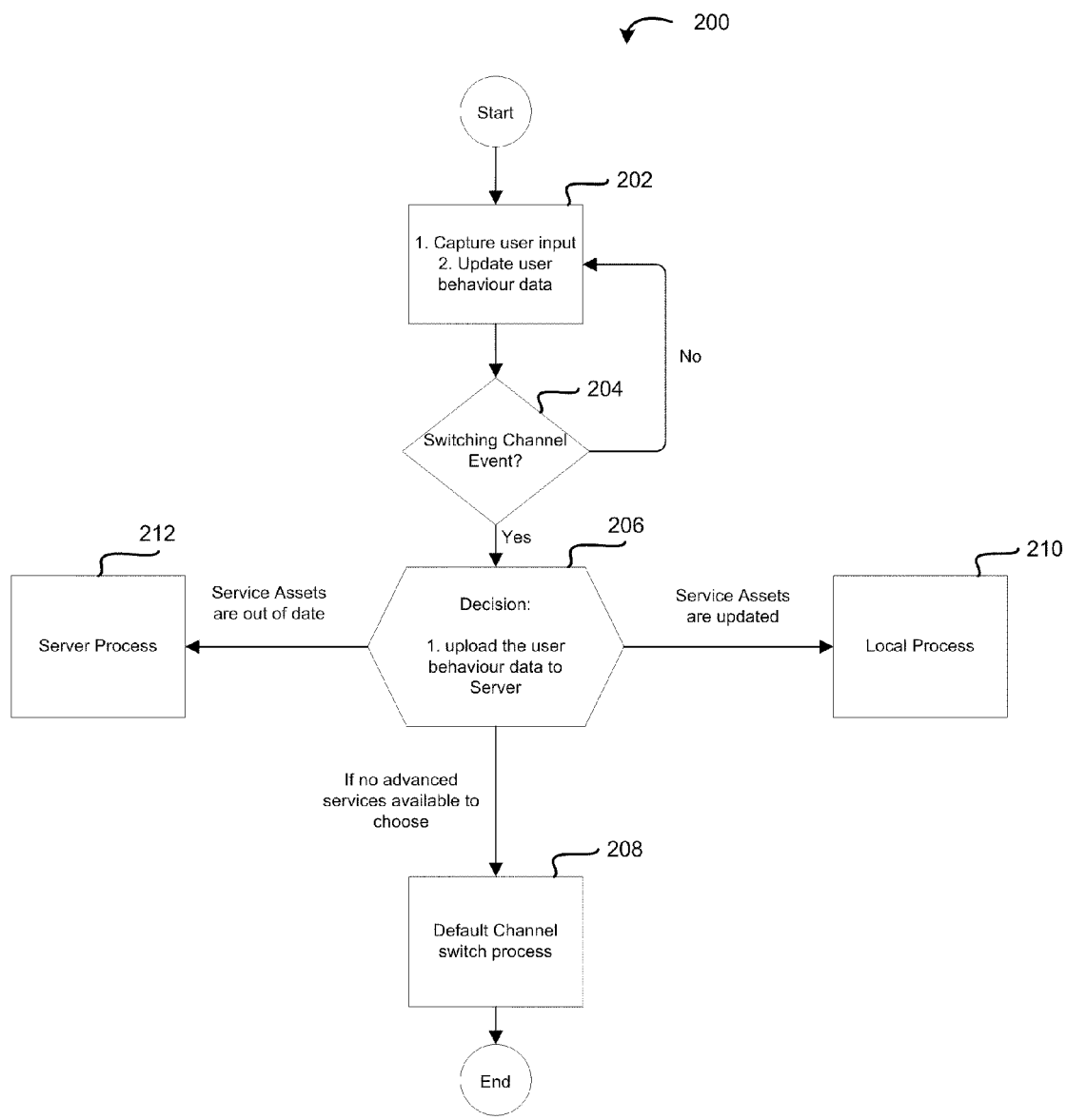
FIG. 2 is a flowchart illustrating a general process of service insertion and placement in accordance with one example embodiment of the present disclosure.

In FIG. 2, one example embodiment of a process 200 of inserting advanced services in a video display is illustrated. The process 200 illustrated in FIG. 2 is specific to the context of broadcast television video, in which a user may request a channel switch from one video broadcast to a different video broadcast. In some instances, this may include the initial launch or start-up of the video display function on the client device, rather than a change from one video already being displayed to another video. The "switching channel event" referred to below should be understood to include the initiation of video display on the client device as well as change from one video to another in the broadcast.

The process 200 is performed by the service insertion agent 30 on the client device 10. The service insertion agent 30 captures information regarding the inputs, selections and viewing history (202). The service insertion agent 30 then updates its user behaviour information based on the detected inputs, selections, etc. (202). While the service insertion agent 30 is capturing user behaviour information, it is also monitoring for a switching channel event (204). While the service insertion agent 30 does not detect a switching channel event it continues to capture user behaviour information. Upon detection of a switching channel event, the service insertion agent 30 uploads the user behaviour data to the server 100 via the service network 50 (206). The server 100 updates its subscriber database 120 with the recent user behaviour information received from the service insertion agent 30. In some embodiments, the service insertion agent 30 regularly shares the user behaviour information with the server 100 prior to detecting the switching channel event. After the server 100 updates its subscriber database 120 with the received user behaviour information, either the service insertion agent 30 or the server 100 determines which service insertion process should be performed: a local process, a server process or a default switching channel process (206).

In one embodiment, the decision (206) first involves the server 100 determining whether an advanced service assets should be selected from the content store 140 based on the updated user behaviour information in the subscriber database 120, and if so, which asset. The server 100 then communicates with the service insertion agent 30 to determine whether this advanced service asset selected by the server 100 is an advanced service asset 40 already locally stored on the client device 10. If so, then a local process is performed (210). If the advanced service asset selected by the server 100 is not available locally, then a server process is performed (212). If the server 100 determines, based on the user behaviour information, that none of the advanced service assets are applicable, and there are no advanced service assets available on the client device 10 or no suitable advanced service assets available on the client device 10, then a default channel switch process is performed (208). In some instances, the user behaviour information will be the same from the last detected switching channel. However, new assets may have been added to the content store 140 after the last detected switching channel event, therefore the local asset database may need to be updated where there are new assets that correspond to the user behaviour, even though the user behaviour information itself has not changed.

A default switching channel process is where no service insertion and placement is performed; that is no advanced service asset is started during the delay before the player begins outputting the desired video as player display data for viewing on the display.

Figure 3:
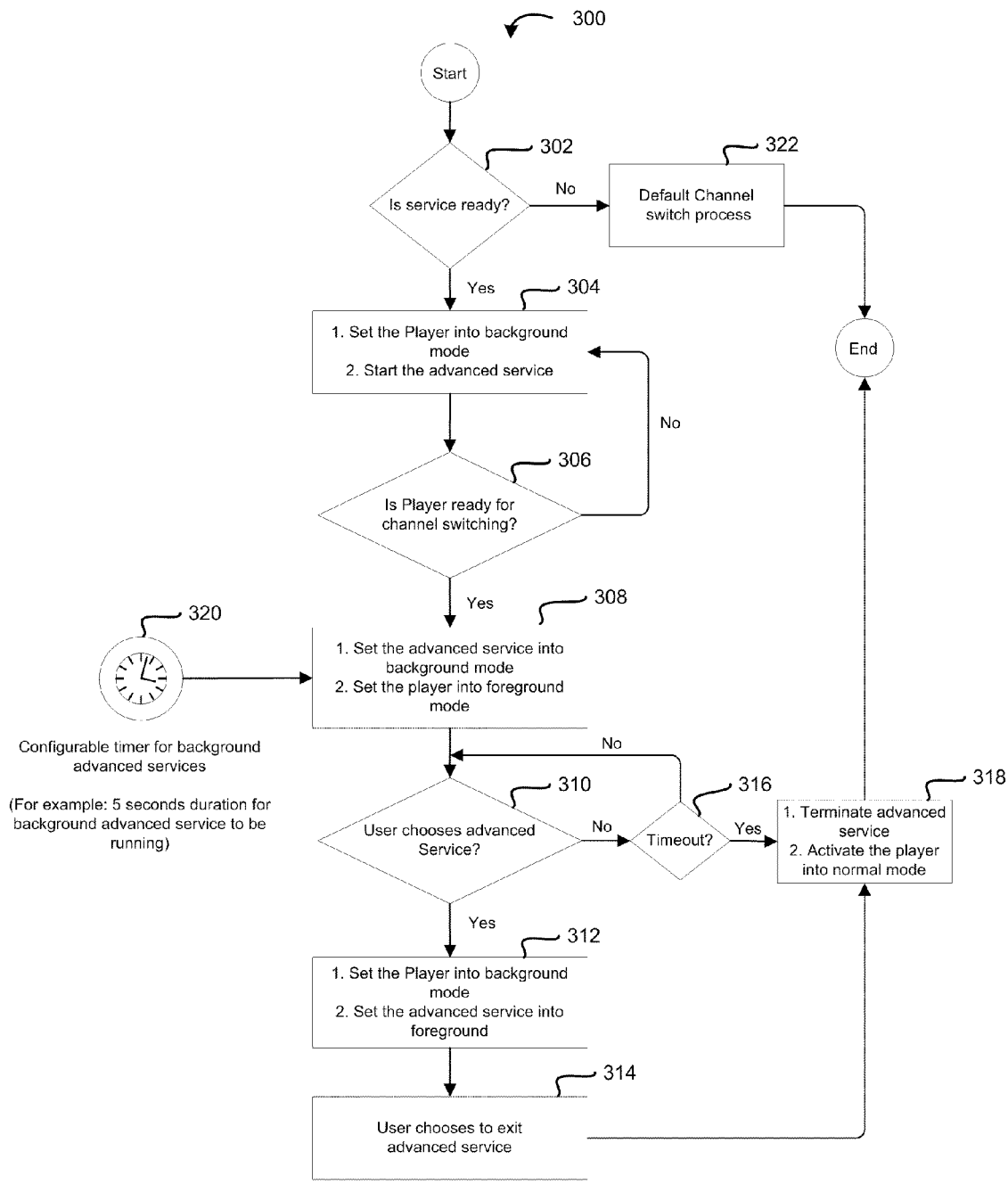
FIG. 3 is a flowchart illustrating a local process for service insertion in accordance with one example embodiment of the present disclosure.

FIG. 3 illustrates one example embodiment of a local process 300. The local process 300 starts with the service insertion agent 30 determining whether the advanced service is ready (302). If the advanced service is not ready after a switching channel event is detected then a default channel switch process is performed (322). If the advanced service is ready, then the player 20 of the client device 10 is set into the background mode and the selected one of the advanced service assets 40 stored locally on the client device 10 is started (304). Then, in this embodiment, the service insertion agent 30 monitors to determine whether the player 20 is ready to perform the switching channel event requested by the user (306), i.e. whether the player 20 is ready to output the requested video/channel as player display data. Until the player 20 is ready to perform the channel switch, the player 20 remains in the background mode and media display data of the advanced service continues to run in the foreground mode. Once the player 20 is ready and outputting player display data for the requested channel, the advanced service asset is set to the background mode and the player 20 is set to the foreground mode (308). In some instances, the player 20 will be able to perform the channel switch immediately, resulting in the advanced service not being played in the foreground for any amount of time, but rather playing in the background mode only. In some embodiments there is a configurable timer that may set the duration for which the advanced service asset runs in the background after a switching channel event has been performed (320). The expiry of the duration for playing the advanced service in the background mode will terminate the advanced service and set the player 20 into a normal mode (316). The normal mode of the player 20 refers to the displaying only the regular video content received through the service network 50 for a particular channel selected.

In the present embodiment, the advanced service may provide an option of retaining it. For example, once the player 20 is brought to the foreground and the advanced service asset is pushed to the background, for the duration of the timer, the client device 10 may permit selection of the advanced service asset in order to cause it to be brought back to the foreground. If prior to the expiry of this duration the client device 10 receives an input selecting the advanced service (310), then the player 20 is set into the background mode and the advanced service is set into the foreground mode (312). The advanced service asset 40 may also provide an exit or close option that terminates the advanced service if selected. Accordingly, if the client device 10 receives an input instructing it to exit the advanced service (314), the advanced service asset will be terminated and the player 20 will be returned to the foreground mode (318). In some embodiments, it may be possible to re-activate the advanced service after it terminates any time with for example a hot key/button on a remote control device.

Figure 4:
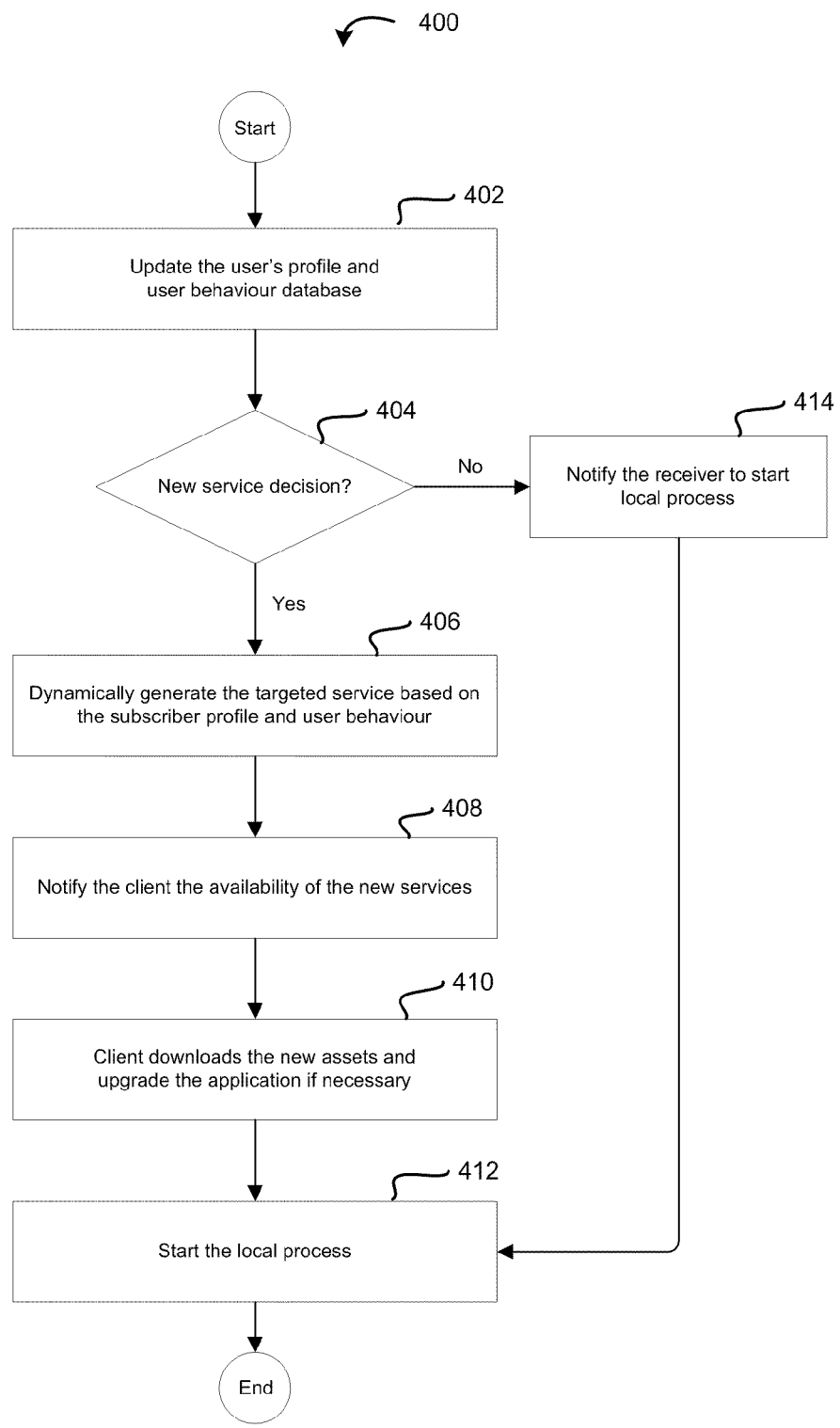
FIG. 4 is a flowchart illustrating a server process for service insertion in accordance with one example embodiment of the present disclosure.

FIG. 4 illustrates one example embodiment of the server process 400. As previously discussed, the server process 400 may be run after a switching channel event is detected and it is determined that the advanced service assets 40, if any, stored on the client device 10 are inappropriate or inapplicable based on the most recent user behaviour. In some embodiments, the server process 400 may be implemented by the application server 102. The server 100 updates the subscriber database 120 with the most recent user profile and behaviour information received from the service insertion agent 30 (402). The server 100 then determines whether there are new advanced service assets available from the content store 140 (404). If no new advanced service assets are available, then the server 100 will notify the service insertion agent 30 to start the local process 300 (414) discussed in connection with FIG. 3, above. If new advanced service assets are available, the server 100 will dynamically generate the targeted advanced service based on the user profile and behaviour information (406). The targeted advanced service will include one or more advanced service assets that correspond to the user profile and behaviour information. The server 100 will then notify the client device 10 of the availability of the new advanced service assets (408). The client device 10 then downloads the new advanced service assets and stores the assets in the local asset storage or memory (410). The service insertion agent 30 on the client device 10 then starts the local process 300 previously discussed (412).

The service insertion agent 30 may also specify how advanced service assets 40 are selected from the plurality of advanced service assets 40 stored in the client device 10. In some embodiments, the client device 10 stores advanced service assets 40 that correspond to the most recent user profile and behaviour information. Since there may be several advanced service assets 40 in the client device 10, the service insertion agent 30 may specify a set of conditions, rules, or criteria by which one of the advanced service assets 40 is to be selected. For example, the advanced service asset 40 to be started after a detected switching channel event may be selected randomly or may be based on the newest advanced service asset available corresponding to the user's behaviour information. In another example, the advanced service asset 40 may be selected in a way that alternates between the type of service. For example, if the first advanced service selected is an ad, then the following advanced service will not be an ad, but will another type of service such as a game, a program recommendation, etc.

The server 100 may also be configured with a set of rules, criteria or conditions to select particular advanced service assets based on the user behaviour information received from the service insertion agent 30. For example, if a user selects a particular type of advanced service often, then the server 100 may give a higher priority or weighting to that type of advanced service asset in the future.

It is readily apparent that the system and method of the present disclosure are not limited to television devices, and that the system and method may be utilized in other devices, such as handheld devices, mobile devices, etc. As well, the application based solution may be utilized by various platforms such as Cable TV, IPTV, Mobile TV, etc. The configuration of the system in FIG. 1 is only an example system 5, and other configurations having different variations of network components may be suitable to perform the general functionality of the system 5.

While the present disclosure is described, at least in part, in terms of methods, a person of ordinary skill in the art will understand that the present disclosure is also directed to the various components for performing at least some of the aspects and features of the described processes, be it by way of hardware components, software or any combination of the two, or in any other manner. Moreover, the present disclosure is also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices.

Although not specifically illustrated, it will be understood that the client device 10 described herein include one or more processors and associated memory. The memory may include one or more application program, modules, or other programming constructs containing computer-executable instructions that, when executed by the one or more processors, implement the methods or processes described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A client device, comprising:
an input mechanism for receiving a video request;
a network interface for receiving a transmitted video over a network in response to the video request;
a player configured to play the transmitted video, including a buffer for storing frames of the transmitted video prior to outputting video for display, wherein the player is configured to output player display data;
a memory storing an advanced service asset, wherein the advance service asset is configured to output media display data;
a display driver for controlling output to a display device;
a processor for executing a service insertion agent, the service insertion agent configured to:
  detect the video request and, in response,
    transmit the video request and user profile and/or behaviour data to an advanced services server,
    when there is a new advanced service asset from the advanced services server based on the received user profile and/or behaviour data, receive from the advanced services server the new advanced service asset, to be a present advanced service asset, otherwise the advanced service asset stored in the memory is the present advanced service asset;
    initiate the present advanced service asset;
    receive both the player display data and the media display data;
    generate a single combined output video having the player display data outputted in a background field of display and the media display data outputted in a foreground field of display;
    supply the single combined output video to the display driver instructing the display driver to display the single combined output video, and
    detect an input to exit the present advanced service asset, and in response to said detection, terminate the present advanced service asset and set the player display data into the foreground field.

2. The client device claimed in claim 1, wherein the video request comprises a channel change request.

3. The client device claimed in claim 2, wherein the client device comprises a television receiver, the transmitted video comprises digital broadcast television, and the network comprises a cable television network.

4. The client device claimed in claim 2, wherein the client device comprises an IPTV receiver, the transmitted video comprises digital broadcast television, and the network comprises a cable IPTV network.

5. The client device claimed in claim 1, wherein the client device comprises a mobile device, and the network comprises a MobileTV network.

6. The client device claimed in claim 1, wherein the advanced service asset comprises an advertisement.

7. The client device claimed in claim 1, wherein the service insertion agent is further configured to monitor inputs and record user selection history, and wherein the service insertion agent is configured to transmit the user selection history to a server over the network, and wherein the service insertion agent is configured to receive a new advanced service asset selected by the server based upon the user selection history.

8. A system, comprising:
the client device claimed in claim 1;
the network; and
a server connected to the network and being configured for communication with the client device over the network,
wherein the client device is configured to, in response to detecting the video request, transmit the video request and user behaviour data to the server,
wherein the server is configured to identify the advanced service asset to be initiated based on the user behaviour, and to inform the client device of the identity of the advanced service asset to be initiated.

9. The system claimed in claim 8, wherein the server is further configured to determine whether the advanced services asset is stored locally on the client device and, if not, then transmit the advanced services asset to the client device to be initiated.

10. The client device claimed in claim 1, wherein the foreground field is partially transparent to enable partial viewing of the background field.

11. The client device claimed in claim 1, wherein the service insertion agent is further configured to detect when the player is ready to output a requested video as player video data; and in response, put the media display data to the background field and put the player display data into the foreground field.

12. The client device claimed in claim 1, wherein the service insertion agent is further configured to select the advanced service asset from a plurality of advanced service assets.

13. The client device claimed in claim 1, wherein the advanced service asset includes an executable application, and wherein initiating the advanced service asset includes launching and executing the executable application.

14. The client device claimed in claim 1, wherein the service insertion agent is further configured to detect an advanced service request, and in response to said detection, re-activate the terminated advanced service asset and set the media display data from the advanced service asset to the foreground field.

15. The client device claimed in claim 14, wherein the reactivated advanced service asset is the same as the terminated advanced service asset.

16. The client device claimed in claim 1, wherein the advanced service asset comprises a video.

17. The client device claimed in claim 1, wherein when there is no new advanced service asset, receiving a notification from the advanced services server to initiate the advanced service asset stored in the memory.

18. A method of operating a client device for displaying video, the client device having a network interface for receiving video transmissions, a player for buffering and outputting video frames for display, and a memory storing an advanced service asset, the method comprising:
detecting a video request input to the client device;
the player receiving and buffering video data based on the video request, wherein the player is configured to output player display data;
in response to detecting the video request,
transmitting the video request and user profile and/or behaviour data to an advanced services server,
when there is a new advanced service asset from the advanced services server based on the received user profile and/or behaviour data, receiving from the advanced services server the new advanced service asset, to be a present advanced service asset, otherwise the advanced service asset stored in the memory is the present advanced service asset;
initiating, by a service insertion agent, the present advanced service asset, wherein the present advanced service asset is configured to output media display data,
receiving, at the service insertion agent, both the player display data and the media display data;
generating, by the service insertion agent, a single combined output video having the player display data outputted in a background field of display and the media display data outputted in a foreground field of display;
supplying, from the service insertion agent to a display driver, the single combined output video instructing the display driver to display the single combined output video,
detecting an input to exit the present advanced service asset, and
in response to said detection, terminating the present advanced service asset and setting the player display data into the foreground field.

19. The method of claim 18, further including terminating the advanced service asset after a predetermined duration in the background unless an input selection activating the advanced service asset is received within the predetermined duration.

20. The method claimed in claim 18, wherein the media service asset has a predetermined duration and further comprising switching the player display data to the foreground after the predetermined duration.

21. The method of claim 18 wherein a plurality of advanced service assets are stored in the client device, and further including selecting one of the plurality of advanced service assets for initiation in response to detecting the video request.

22. The method claimed in claim 18, wherein the video request comprises a channel change request.

23. The method claimed in claim 18, further comprising monitoring inputs and recording user selection history, transmitting the user selection history to a server over the network, and receiving and storing a new advanced service asset selected by the server based upon the user selection history.

24. The method claimed in claim 18, wherein the advanced services server further determines whether the advanced services asset is stored locally on the client device and, if not, then transmitting the advanced services asset to the client device to be initiated.

25. The method of claim 18, wherein the foreground field is partially transparent to enable partial viewing of the background field.

26. The method of claim 18, further comprising detecting when the player is ready to output a requested video as player video data; and in response, setting the media display data to the background field and setting the player display data into the foreground field.

27. The method of claim 18, further comprising selecting the advanced service asset from a plurality of advanced service assets.

28. The method of claim 18, wherein the advanced service asset includes an executable application, and wherein initiating the advanced service asset includes launching and executing the executable application.

29. The method of claim 18, further comprising detecting an advanced service request, and in response to said detection, re-activating the terminated advanced service asset and setting the media display data from the advanced service asset to the foreground field.

30. The method claimed in claim 18, wherein the advanced services server further updates a subscriber database with the received user profile and/or behaviour data.

31. The method claimed in claim 18, wherein when there is no new advanced service asset, receiving a notification from the advanced services server to initiate the advanced service asset stored in the memory.

32. The method claimed in claim 18, wherein the advanced services server dynamically generates a targeted advanced service based on the received user profile and/or behaviour information.

33. The method claimed in claim 32, wherein the targeted advanced service includes one or more advanced service assets that correspond to the user profile and/or behaviour information.

* * * * *